United States Patent [19]

King et al.

[11] 4,127,566
[45] Nov. 28, 1978

[54] PROCESS FOR PREPARATION OF FLAME RETARDANT POLYESTERS

[75] Inventors: Henry L. King, Cary; Chester C. Wu, Raleigh, both of N.C.

[73] Assignee: Monsanto Company, Decatur, Ala.

[21] Appl. No.: 863,285

[22] Filed: Dec. 22, 1977

[51] Int. Cl.$^2$ .............................................. C08G 63/14
[52] U.S. Cl. ................................ 528/283; 260/45.7 P; 528/273; 528/287; 528/194
[58] Field of Search ................. 260/75 P, 75 R, 45.7 P

[56] References Cited

U.S. PATENT DOCUMENTS

| 3,459,711 | 8/1969 | Hartmann et al. | 260/75 R |
| 3,651,017 | 3/1972 | Tanabe et al. | 260/75 R |

Primary Examiner—Lucille M. Phynes
Attorney, Agent, or Firm—Robert L. Broad, Jr.

[57] ABSTRACT

A process for preparation of flame retardant, fiber-forming polyesters by polycondensing a glycol phthalate and a phosphine oxide in the presence of the reaction product of germanium dioxide and a tetraalkyl ammonium hydroxide.

6 Claims, No Drawings

PROCESS FOR PREPARATION OF FLAME RETARDANT POLYESTERS

BACKGROUND OF THE INVENTION a. Field of the Invention

This invention relates to methods for making flame-retardant, fiber-forming polyester polymers.

b. Prior Art

It is known to use germanium dioxide as a catalyst in a polycondensation reaction to produce polyesters. Usually, the germanium dioxide is added to the reaction mixture with a glycol, such as ethylene glycol. Unfortunately, the crystalline germanium dioxide has a very low solubility in the glycol, resulting in undissolved catalyst which remains in the polymer. The undissolved catalyst particles may easily result in undesirable physical properties in fibers made from the polymer. Also, low catalyst concentrations result in longer reaction times. Further, this catalyst tends to promote the formation of undesirable side products such as diethylene glycol.

Other catalysts, such as zinc acetate, arsenic oxide and glycoloxide and tetrabutyl titanate, have been used to prepare polyesters. These catalysts usually require unduly long polymerization times and frequently result in badly discolored polymers. Apparently, conventional catalysts complex with phosphine oxides.

It has been found that the use of the germanium dioxide/tetraalkyl ammonium hydroxide catalyst of this invention results in faster condensation rates, lower formation of undesired side products and insures superior whiteness of fibers made from the polymer prepared by this invention.

SUMMARY OF THE INVENTION

In a process for preparation of fiber-forming polyesters by polycondensing a glycol phthalate and a phosphine oxide in the presence of the reaction product of germanium dioxide and a tetralkyl ammonium hydroxide. The germanium dioxide may be reacted in the presence of water or a glycol which is suitable for use in making fiber-forming polyesters. Examples of the tetraalkyl ammonium hydroxide are tetra methyl and tetra ethyl ammonium hydroxide.

DETAILED DESCRIPTION OF THE INVENTION

In the process of the present invention, a prepolymer is formed by reacting a glycol with a dibasic acid such as terephthalic acid in a known manner. The glycol phthalate prepolymer may then be reacted with a phosphine oxide by a polycondensation reaction, resulting in the formation of high polymers. The presence of the phosphine oxide in the polymer enhances the flame retardancy of fibers made from the polymer.

Other glycols, such as propane diol, butane diol, pentane diol or hexane diol may be used instead of the ethylene glycol in making the prepolymer, though ethylene glycol is preferred. Other dibasic acids may be used with the glycol to form the prepolymer. Isophthalic and terephthalic acids are the preferred acids, with terephthalic acid being the most preferred.

In order to provide a polyester polymer having improved flame retardance, the prepolymer is reacted, by the process of the present invention, in a polycondensation reaction with a phosphine oxide which will impart flame retardance to the polymer. The polycondensation reaction is carried out at conventional pressures and temperatures. The phosphine oxide will have the formula:

where R, R' and R" are alkyl, aryl, alkaryl or cycloalkyl radicals and at least one of R, R' and R" contains an ester or an ester forming group.

While other phosphine oxides are suitable, those preferred are bis(carboxyethyl) methyl phosphine oxide, bis (hydroxypropyl) phenyl phosphine oxide, bis(carboxyethyl) phenyl phosphine oxide, bis(4-carboxyphenyl) methyl phosphine oxide, and bis(carboxyphenyl) phenyl phosphine oxide, with bis(carboxyethyl) methyl phenyl phosphine oxide, with bis (3-hydroxypropyl) phenyl phosphine oxide being the most preferred. Other phosphine oxides which may be used are:

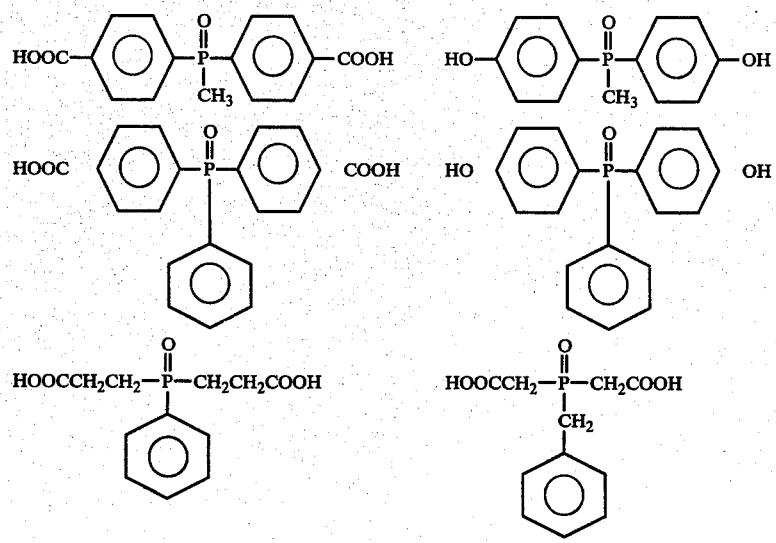

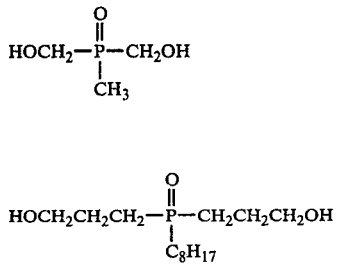

-continued

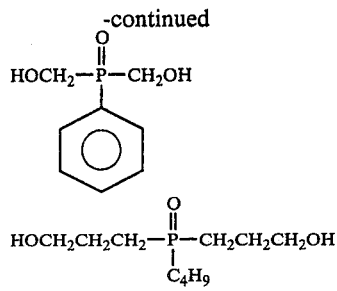

HOCH$_2$CH$_2$CH$_2$—P(=O)(C$_8$H$_{17}$)—CH$_2$CH$_2$CH$_2$OH

HOCH$_2$CH$_2$CH$_2$—P(=O)(C$_4$H$_9$)—CH$_2$CH$_2$CH$_2$OH

Also diphosphine oxides:

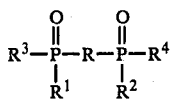

in which at least one of $R^1$-$R^4$ is an ester forming group.

The phosphine oxide may be monofunctional, difunctional or trifunctional. However, the difunctional oxide is preferred, for the reason that monofunctional oxides have a chain terminating effect and trifunctional oxides have a crosslinking effect. Halogenated phosphine oxides are included.

The polycondensation reaction is carried out in the presence of the reaction product of germanium dioxide and a tetraalkyl ammonium hydroxide (TAAH). Either tetramethyl ammonium hydroxide (TMAH) or tetraethyl ammonium hydroxide (TEAH) may be used. The germanium dioxide and tetraalkyl ammonium hydroxide may be reacted in the presence of water or in a glycol suitable for preparing fiber-forming polyesters. The germanium dioxide and tetraalkyl ammonium hydroxide react in a molar ratio of 1:1. One mole of tetraethyl ammonium hydroxide is required to cause one mole germanium dioxide to go into solution. The solution is then filtered to remove any insoluble material and the water added with the tetraethyl ammonium hydroxide is, optionally, removed by distillation. The resulting solution is a clear, colorless solution of germanium dioxide/tetraalkyl ammonium hydroxide in glycol or water which is used as a catalyst in the polycondensation reaction.

The glycol catalyst mixture may contain 1 to 25 weight percent germanium dioxide. The preferred amount is 5-15 weight percent. Greater amounts of GeO$_2$/TAAH in the glycol will of course require less of the catalyst solution to carry out the polycondensation reaction. When the catalyst solution is added to the glycol phthalate/phosphine oxide reaction mixture, the amount of germanium dioxide should be 0.008 to 0.04 weight percent, based on the weight of the glycol phthalate.

The flame retardancy of the polymers made by method of this invention were determined by extruding the polymer through a 10-hole spinnerette to form filaments, quenching the filaments in a water bath and then collecting them on a Leesona Model 955 take-up machine. The filaments were drawn 5.0 times over a hot pin at 80° C. to yield a 50 denier yarn. The drawn yarn was knitted into 9 cm diameter tubing with 1 ply of 50 denier fiberglass on a Lawson knitter to contain 14 courses per cm with a 54 gauge head of 220 needles. Oxygen indices of the knit tubing, containing equal weights of polymer and fiberglass, were determined using an MKM Model JD-14 oxygen index (OI) flammability tester. Knit tubing was mounted on a 4.4 × 15.2 cm metal frame and oxygen indices determined with a flow rate of 4± 1 cm$^3$/second combined oxygen and nitrogen. The Delta OI was determined as the difference in OI between unmodified poly(ethyleneterephthalate) and the polymers of this invention.

The prepolymer which is reacted with the phosphine oxide may be prepared in a known manner. For example, ethylene glycol and terephthalate acid in a molar ratio of 2:1 may be reacted at about 270° and 20 pounds pressure in a continuous polyester esterifier. Water of reaction and some ethylene glycol are removed by distillation and the low molecular weight prepolymer product collected continuously through a valve at the bottom of the reactor. With an average residence time in the reactor of 135 minutes, the low molecular weight prepolymer will have an intrinsic viscosity of about 0.08 and a carboxyl concentration of about 660 microequivalents per gram, both measured in the usual manner. This and other processes for making the prepolymer are known.

EXAMPLE I

This example illustrates a method for making the germanium dioxide/TAAH catalyst. Two grams of germanium dioxide were heated with ethylene glycol and, while still hot, a 40% aqueous solution of tetraethyl ammonium hydroxide was added dropwise until solution of the germanium dioxide in the glycol was complete. The solution was filtered to remove a small amount of insoluble material and heated further to remove water. The clear, colorless solution remaining weighed 30.2 grams and had a GeO$_2$ equivalent of 0.066 grams/g. of solution.

EXAMPLE II

This example illustrates another method for preparing the catalyst used in the process of the present invention.

GeO$_2$ in crystalline form was added to a 40% aqueous solution of tetraalkyl ammonium hydroxide at room temperature. The GeO$_2$ immediately went into solution. Thus, the GeO$_2$ and the TAAH may be reacted in the presence of water simply by adding crystalline GeO$_2$ to a commercially available aqueous solution of TAAH. The water may be distilled off prior to use of the catalyst or may be removed during the polycondensation reaction.

EXAMPLE III (COMPARATIVE)

Two hundred grams of prepolymer, prepared as described above, and 0.75 milliliters of GeO$_2$/TEAH catalyst solution were added to a 1 liter capacity, stirred, batch autoclave, the autoclave then being purged with nitrogen and heated to 275°–280° C. Pressure in the system was reduced by applying a vacuum and polymerization to form high molecular weight poly(ethylene terephthalate) continued at a temperature of 275°–280°C. and a pressure of less than 2 mm Hg until the desired molecular weight was obtained. No phosphine oxide was used. A polymer with a melting point of 255° C. and at an intrinsic viscosity of 0.64 was obtained in a period of 69 minutes from the start of pressure reduction. The polymer was spun into filamnets and drawn and knit into tubing with fiberglass as described above. The oxygen index of the tubing was only 20.0.

EXAMPLE IV

Two hundred grams of prepolymer and 0.75 ml of GeO$_2$/TEAH catalyst solution were added to an autoclave, purged with nitrogen, and heated to 230°–250° C. Pre-melted bis(carboxyethyl) methyl phosphine oxide having the structure

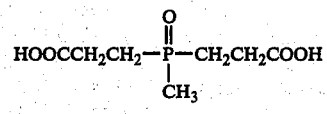

in the amount of 10.5 grams was added through an addition port on top of the autoclave. The autoclave was raised to a temperature of 275°–280° C. over a period of 45–60 minutes. Pressure in the autoclave was reduced by applying a vacuum and polymerization to form a high molecular weight polymer continued at a temperature of 275°–280° C. and a pressure of less than 2 mm Hg until the desired molecular weight was obtained. A polymer with an intrinsic viscosity of 0.62 was obtained in a polymerization period of 60 minutes. The polymer had a melting point of 245° C., a purity of 2.7 and a brightness of 90.0. When tested as described above, the fiber from the polymer had an oxygen index of 22.2.

EXAMPLE V

Two hundred grams of the prepolymer and 0.75 ml of GeO$_2$/TEAH catalyst solution were added to the autoclave and, after the autoclave had been purged with nitrogen, were heated to 230°–250° C. 12.5 grams of bis(3-hydroxypropyl) phenyl phosphine oxide having the structure

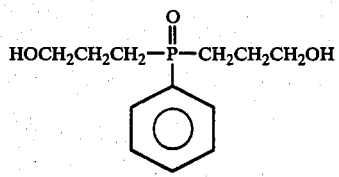

was added through an addition port on top of the autoclave. The phosphine oxide was allowed to react with the prepolymer and pressure in this system was reduced by applying a vacuum. Polymerization to form a high molecular weight polymer was continued at a temperature of 275°–280° C. and a pressure of less than 2 mm Hg until the desired molecular weight was obtained. The polymer had an intrinsic viscosity of 0.56 and a melting point of 240° C. The polymer had a purity of 2.5 and a brightness of 90.2. When filaments from the polymer were knitted with fiberglass as described above, the oxygen index was determined to be 22.2.

EXAMPLE VI

Example IV was repeated except that the bis(hydroxypropyl) phenyl phosphine oxide was added to the prepolymer at a temperature of 270° C. Fibers from the resulting polymer were determined to have an oxygen index of 22.0.

EXAMPLES VII–XI

Polymers were prepared as in Example IV and fibers from these polymers were tested for purity, brightness and oxygen index. Table 1 shows the result.

TABLE 1

| Example No. | Wt. Phosphine Oxide | Intrinsic Viscosity | M.P. °C | Purity | Brightness | OI |
|---|---|---|---|---|---|---|
| VII | 10.5 | 0.64 | 243 | 3.2 | 90.6 | 22.1 |
| VIII | 10.5 | 0.67 | 242 | 3.1 | 90.4 | 22.1 |
| IX | 0 | 0.66 | 251 | 2.2 | 89.1 | 19.7 |
| X | 10.5 | 0.66 | 243 | 2.9 | 88.2 | 22.3 |
| XI | 0 | 0.64 | 251 | 1.8 | 91.2 | 19.8 |

Examples IX and XI were included as comparative examples and no phosphine oxide was used. It will be noted that the OI of the fiber from these examples was less than 20.

EXAMPLES XII–XVI (COMPARATIVE)

These examples are included to show the disadvantages found in using conventional catalyst to prepare polyesters containing phosphine oxides.

A copolymer of poly(ethylene terephthalate) with bis(carboxyethyl)methyl phosphine oxide was prepared as in Example V except that other well known polymerization catalysts were used. These preparations yielded the following results:

| Example | Catalyst | Catalyst wt., g | Polymerization Time, Min. | Intrinsic Viscosity | Purity | Brightness |
|---|---|---|---|---|---|---|
| XII | Zinc Acetate | 0.15 | 135 | 0.47 | 6.0 | 86.9 |
| XIII | Arsenic Oxide | 0.10 | 210 | 0.46 | 4.7 | 87.7 |
| XIV | Arsenic Glycoloxide | 0.15 | 225 | 0.47 | 4.3 | 88.7 |
| XV | Tetrabutyl Titanate | 0.20 | 60 | 0.57 | 27.2 | 54.9 |
| XVI | Antimony Glycoloxide plus calcium acetate | 0.05 0.10 | 85 | 0.56 | 10.8 | 71.6 |

The first 3 catalysts (Examples XII, XIII and XIV) resulted in extremely long polymerization times and poorer polymer colors than was obtained with the GeO$_2$/TEAH catalyst of this invention. Even with the long polymerization times the desired high molecular weights were not obtained. The last two catalysts resulted in more normal polymerization times, but the polymers were yellow to brown and grey in color.

EXAMPLE XVII (COMPARATIVE)

Two hundred grams of the ethylene terephthalate prepolymer described above and 10.5 grams of bis(carboxyethyl) methyl phosphine oxide were added to a 1 liter batch autoclave with 400 parts per million, based on prepolymer weight, of a commercially available germanium catalyst. The autoclave was purged with nitrogen and heated to 275°–280° C. Pressure in the autoclave was reduced and polymerization was carried out at a pressure of 2 mm Hg to produce a polymer having an intrinsic viscosity of 0.58. The polymer melted at 244° C., had a brightness of 90, an oxygen index of 22.1 and analyzed 0.74 weight percent phosphorous.

While polymer properties were good, the polymerization time was 138 minutes, about twice the time required when the $GeO_2$/TEAH catalyst of this invention is used.

When Example XVII was repeated using 300 ppm of the same catalyst a polymerization time of 106 minutes was required to obtain a polymer having an intrinsic viscosity of 0.56. Fiber properties were good but the polymerization time required was too great.

What is claimed is:

1. In a process for preparation of fiber-forming polyesters by polycondensing a glycol phthalate and a phosphine oxide having the formula

where R, R' and R" are alkyl, aryl, alkylaryl or cycloalkyl radicals and at least one of R, R' and R" contains an ester or an ester forming group, in the presence of an effective amount of the reaction product of germanium dioxide and a tetraalkyl ammonium hydroxide.

2. The method of claim 1 wherein the tetraalkyl ammonium hydroxide is selected from the group consisting of tetramethyl ammonium hydroxide and tetraethyl ammonium hydroxide.

3. The method of claim 2 wherein the glycol phthalate is selected from the group consisting of ethylene terephthalate and ethylene isophthalate.

4. The method of claim 3 wherein the phosphine oxide is selected from the group consisting of bis(carboxyethyl) methyl phosphine oxide, bis(hydroxypropyl) phenyl phosphine oxide, bis(carboxyethyl) phenyl phosphine oxide, bis(carboxyphenyl) methyl phosphine oxide and bis(carboxyphenyl) phenyl phosphine oxide.

5. The method of claim 4 wherein the phosphine oxide is bis(carboxyethyl) methyl phosphine oxide.

6. The method of claim 4 wherein the phosphine oxide is bis(3-hydroxypropyl) phenyl phosphine oxide.

* * * * *